Patented Jan. 5, 1932

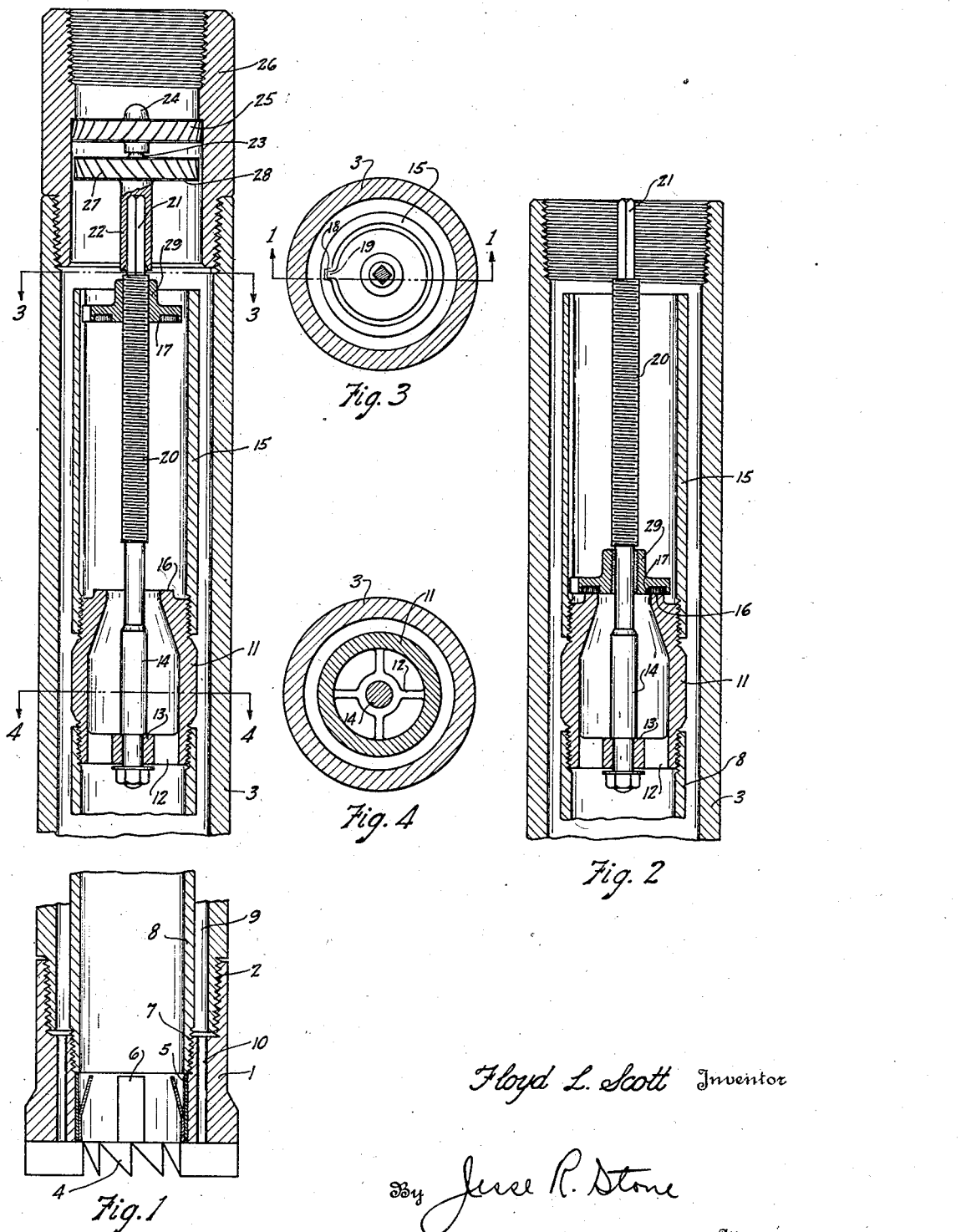

1,839,417

UNITED STATES PATENT OFFICE

FLOYD L. SCOTT, OF HOUSTON, TEXAS, ASSIGNOR TO HUGHES TOOL COMPANY, OF HOUSTON, TEXAS, A CORPORATION OF TEXAS

TURBINE OPERATED VALVE

Application filed July 23, 1927. Serial No. 208,001.

My invention relates to valves employed in core drills for use in deep wells. It has particular reference to slowly closing valves adapted to close the upper end of the core barrel when the core is being cut.

It is an object of the invention to provide a valve which will remain in open position when the drill is being introduced into the well, but which may be closed by action of the flushing water when the tool is in position to begin drilling.

It is desired that the valve close but slowly so that the lower end of the tool be cleaned of mud before the core is taken.

The invention contemplates a valve which is moved onto its seat through the action of a screw rotated through the flow of the flushing fluid.

Referring to the drawings herewith, Fig. 1 is a central vertical section through a core drill employing my invention, said section being on the plane 1—1 of Fig. 3.

Fig. 2 is a fragmental longitudinal view similar to Fig. 1, but showing the valve in a different position.

Fig. 3 is a transverse section on the plane 3—3 of Fig. 1.

Fig. 4 is a transverse section on the plane 4—4 of Fig. 1.

The core drill employed may be any common type of drill and I have shown a scraping rotary drill having a head 1, of tubular form with its upper shank 2 threaded to engage a drill collar 3. The forward end of the drill is toothed at 4; and, above the teeth within the core opening, is a core catcher 5 with spring fingers 6 thereon to engage the core. The interior of the head is threaded at 7 to receive the core barrel 8 which is spaced from the drill collar to form an annular chamber 9 to which channels 10 in the head are connected to allow discharge of flushing fluid.

The core barrel is connected, at its upper end, to a guide barrel 15, by means of a coupling 11. Said coupling has a spider 12 at its lower end supporting a hub or bearing 13, which in turn, supports a rod 14, extending axially upwardly within the guide barrel 15. The interior surface of the coupling is tapered upwardly at its upper end and an annular seat 16 is formed thereon to receive a valve 17.

The guide barrel 15 is open at its upper end which is set at a predetermined distance above the valve seat. The barrel serves to guide the valve 17. It has a groove or keyway 18 at one side to receive a tenon or key on the valve so as to prevent rotation of said valve, the body of the valve being spaced from the walls of the guide barrel to allow free flow of flushing fluid past the valve when the valve is open.

The valve 17 is a disc shaped plate with a packing groove on its lower face to fit upon the valve seat. It has a central hub 19 which is threaded to engage the threaded portion 20 of the rod 14, so that when said rod is rotated, the valve will be moved thereon in a direction depending upon the direction of rotation of the rod.

The threaded portion 20 of the rod is slightly larger than the portions above and below the threaded portions as will be noted. The upper end of the rod is squared at 21 to fit slidably within a squared socket 22 on a rotatable shaft 23.

The shaft 23 is secured rotatably within a bearing 24 formed centrally of a spider 25 fitting non-rotatably within a bushing 26 coupled at the upper end of the drill collar 3. The spider 25 is specially formed with spirally radiating vanes or blades thereon, which are inclined to act as a stator directing the flushing fluid against the oppositely inclined blades 27 of a rotor wheel 28, on said shaft 23, above the socket 22.

The tool will be assembled as shown in Fig. 1 and the device will be introduced into the well. When the bottom of the hole is reached, the pumps will be operated to force the flushing fluid through the core barrel to clean it of any material received therein while the tool was being lowered.

The action of the fluid will be to also rotate the rotor 28 and the shaft 14 in a direction to screw the valve slowly down on to its seat. It will be noted that when the valve reaches the lower end of the threaded portion 20 of the rod, it will drop loose and be forced on to its seat. It will thereafter be free to rise under pressure from below to allow escape of fluid moved upwardly by the core.

When the valve has been seated, the drill may be rotated to obtain a core, and the core will be free of any contaminating material within the core barrel.

It will be obvious that the valve closing means which I have adopted is simple and positive in its action and may be readily adjusted to close the valve when the bottom of the hole has been properly cleaned.

What I claim as new is:

1. A core drill including a core barrel, a guide barrel thereon, a valve seat in said guide barrel, a screw rod in said guide barrel, a valve threaded on said rod, and means actuated by the flow of flushing fluid to rotate said shaft and screw said valve downwardly to its seat.

2. A core drill including a core barrel, a guide barrel, a coupling connecting said barrels, a valve seat on said coupling, a screw rod on said coupling, a valve on said screw rod and means to rotate said rod and screw said valve toward said seat.

3. A core drill including a core barrel, a guide barrel, a coupling connecting said barrels, a valve seat on said coupling, a screw rod, a valve on said screw rod, and means to rotate said rod and screw said valve toward said seat, said means being responsive to a flow of flushing fluid through the body of said drill.

4. A core drill including a core barrel, a guide barrel, a coupling connecting said barrels, a valve seat on said coupling, a screw rod on said coupling, a valve on said screw rod, means on said valve engaging means in said guide barrel to prevent rotation of said valve, and means to rotate said rod and screw said valve toward said seat.

5. A core drill having a core barrel, a valve adapted to close the upper end thereof, means to hold said valve from its seat, said means being rotated by the flow of flushing fluid through said drill to move said valve slowly to its seat.

6. A core drill having a core barrel, a valve adapted to close the upper end of said core barrel, a screw rod upon which said valve is mounted, means to rotate said screw rod to move said valve, and means to prevent rotation of said valve.

7. A core drill having a core barrel, a valve adapted to close the upper end of said core barrel, a screw rod upon which said valve is mounted, means, operated by the flow of flushing fluid to rotate said screw to move said valve, and means to prevent rotation of said valve.

8. The combination of a core barrel, a valve seat at its upper end, a valve above said seat, and a screw rod operating said valve and adapted to move said valve slowly to its seat.

9. A core drill having a core barrel, a normally raised valve adapted to close the upper end thereof, and a valve operating mechanism including a turbine rotated by the flow of flushing fluid through a drill to move said valve to its seat.

In testimony whereof, I hereunto affix my signature, this the 5th day of July, A. D. 1927.

FLOYD L. SCOTT.